United States Patent [19]
Patterson et al.

[11] Patent Number: 5,971,145
[45] Date of Patent: *Oct. 26, 1999

[54] CRUSH RESISTANT CARTRIDGE CASE

[75] Inventors: Robert S. Patterson, Ogden; Brian R. Schick, Eden; Edward L. Rich, Ogden, all of Utah

[73] Assignee: Iomega Corporation, Roy, Utah

[*] Notice: This patent is subject to a terminal disclaimer.

[21] Appl. No.: 09/066,511

[22] Filed: Apr. 24, 1998

Related U.S. Application Data

[63] Continuation of application No. 08/745,809, Nov. 8, 1996, Pat. No. 5,850,914
[60] Provisional application No. 60/007,497, Nov. 22, 1995.

[51] Int. Cl.⁶ .................................................. B65D 85/30
[52] U.S. Cl. ............................. 206/308.3; 206/387.13; 206/472; 281/29
[58] Field of Search ........................... 206/308.3, 387.13, 206/312, 472; 220/4.22; 281/29, 36, 23, 19.1; 156/245

[56] References Cited

U.S. PATENT DOCUMENTS

| | | | |
|---|---|---|---|
| 2,677,376 | 5/1954 | Brunner | 281/29 |
| 3,572,957 | 3/1971 | Srassberg | 281/29 |
| 4,582,442 | 4/1986 | Rager | 281/29 |
| 5,030,027 | 7/1991 | Bachrach et al. | 281/29 |
| 5,145,068 | 9/1992 | Schmitz et al. | 206/472 |

*Primary Examiner*—David T. Fidei
*Assistant Examiner*—Nhan T. Lam
*Attorney, Agent, or Firm*—Woodcock Washburn Kurtz Mackiewicz & Norris LLP

[57] ABSTRACT

A crush resistant cartridge case comprises a case shell having left and right halves. Each halve of the case shell contains a rigid insert having a flat portion with a rib extending substantially around the perimeter of the flat portion. The rigid inserts in the left and right halves of the case shell come together when the case shell is closed and provide resistance against crushing.

5 Claims, 4 Drawing Sheets

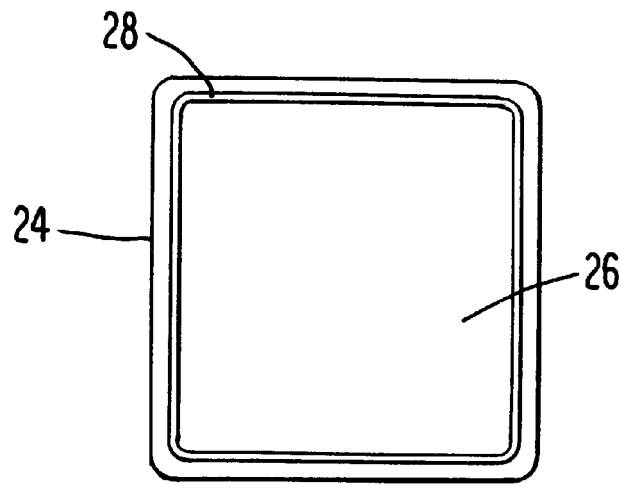
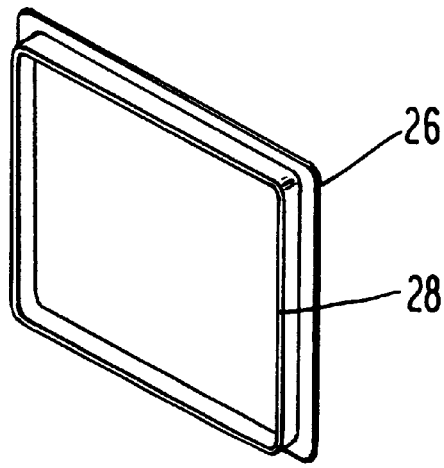

CRUSH RESISTANT CARTRIDGE CASE

CROSS-REFERENCE TO RELATED APPLICATIONS

This application is a continuation of application Ser. No. 08/745,809 filed Nov. 8, 1996, now U.S. Pat. No. 5,850,914, which is based on, and claims priority of, provisional application Ser. No. 60/007,497, filed Nov. 22, 1995.

BACKGROUND OF THE INVENTION

Removable disk cartridges for storing digital electronic information typically comprise an outer casing or shell that houses a magnetic, magneto-optical or optical disk upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge at a given speed. The outer shell of the cartridge typically has an aperture near one edge to provide the recording heads of the drive with access to the disk. A shutter or door mechanism is often provided to cover the aperture when the cartridge is not in use to prevent dust or other contaminants from entering the cartridge and settling on the recording surface of the disk.

Removable disk cartridges are often carried in cases by users, and are also often sold in cases to protect the cartridge during shipment, etc. Prior art cartridge cases do not provide sufficient protection against crushing. For example, typical prior art cartridge cases have flat cardboard inserts that provide stiffness for the top and bottom surfaces of the cartridge case, but do not provide a means of protecting the contents from crushing. Accordingly, there is a need for a crush resistant cartridge case. The present invention satisfies this need.

SUMMARY OF THE INVENTION

The present invention is directed to a crush resistant cartridge case for removable disk cartridges. Rigid inserts having a rib formed around their perimeters make the cartridge case resistant to crushing. The inserts are contained on the inside of the shell of the cartridge case.

BRIEF DESCRIPTION OF THE DRAWINGS

The following description of the invention is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 3A is a bottom view of a right insert of the crush resistant case of FIGS. 1A–C;

FIG. 3B is a side view of the right insert;

FIG. 3C is a perspective view of the right insert; and

DETAILED DESCRIPTION OF THE PREFERRED EMBODIMENT

Figure 1A:
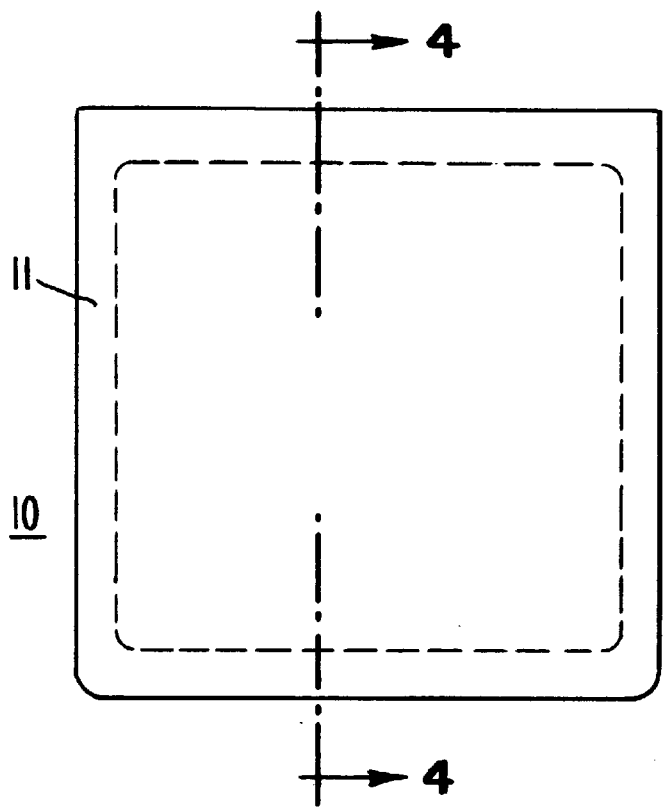
FIG. 1A is a top view of a crush resistant case in accordance with the is present invention.
Figure 1B:
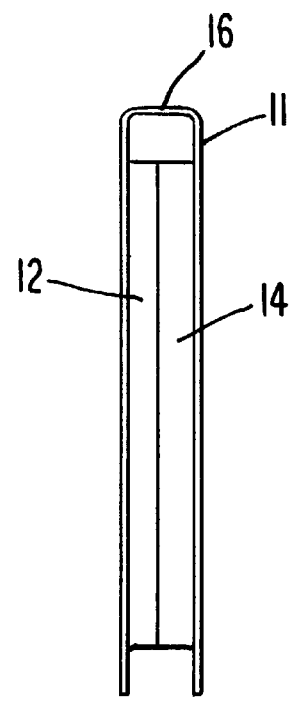
FIG. 1B is a side view of the crush resistant case.
Figure 1C:
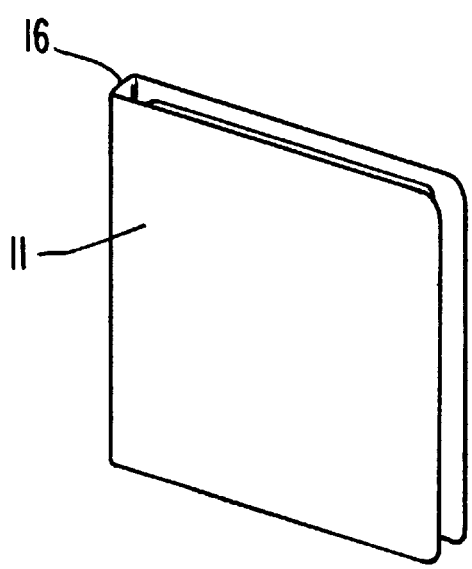
FIG. 1C is a perspective view of the crush resistant case.

Referring to the drawings wherein like numerals indicate like elements throughout, FIGS 1A–1C show a crush resistant case 10 for a removable disk cartridge according to a preferred embodiment of the present invention. The crush resistant case of the present invention comprises a case shell 11 having left and right halves 12, 14 joined together by a common spine 16. According to the present invention, the case shell 11 contains left and right rigid inserts (FIGS. 2 & 3) that resist crushing from all sides of the case 10. The terms "left," "right," "top," and "bottom," are used herein for convenience of illustration only, and are not meant to be limiting.

Figure 2B:
FIG. 2B is a side view of the left insert.
Figure 2A:
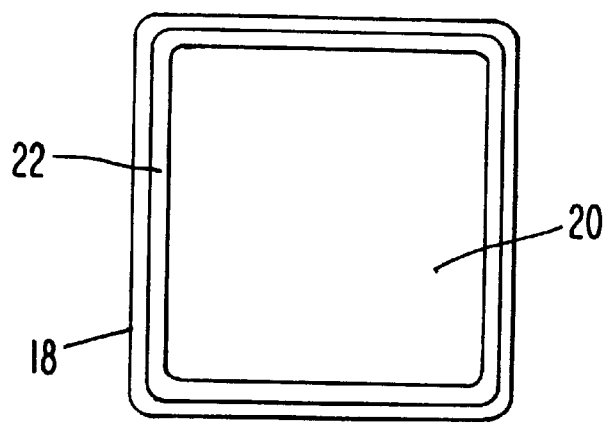
FIG. 2A is a bottom view of a left insert of the crush resistant case of FIGS. 1A–C.
Figure 2C:
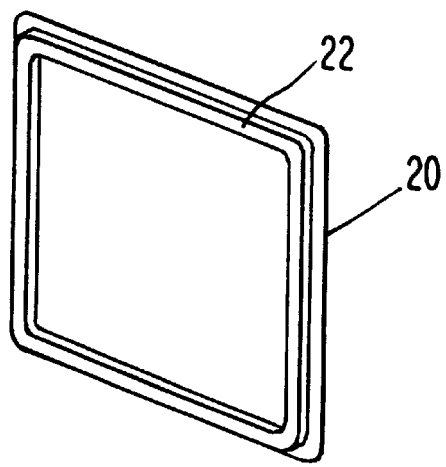
FIG. 2C is a perspective view of the left insert.

FIG. 2A shows the left rigid insert 18 in greater detail. The left rigid insert 18 has a flat portion 20 with a rectangular rib 22 extending around the perimeter of the flat portion 20. FIGS. 2B and 2C show side and perspective views of the left rigid insert, respectively.

FIG. 3A shows the right rigid insert 24 in greater detail. The right rigid insert 24 also has a flat portion 26 with a rectangular rib 28 extending around the perimeter of the flat portion 26. FIGS. 3B and 3C show side and perspective views of the right rigid insert, respectively. In the preferred embodiment, the left and right rigid inserts 18, 24 are each formed of a rigid plastic material, such as, for example, high impact styrene. However, other rigid materials may be employed.

Figure 4:
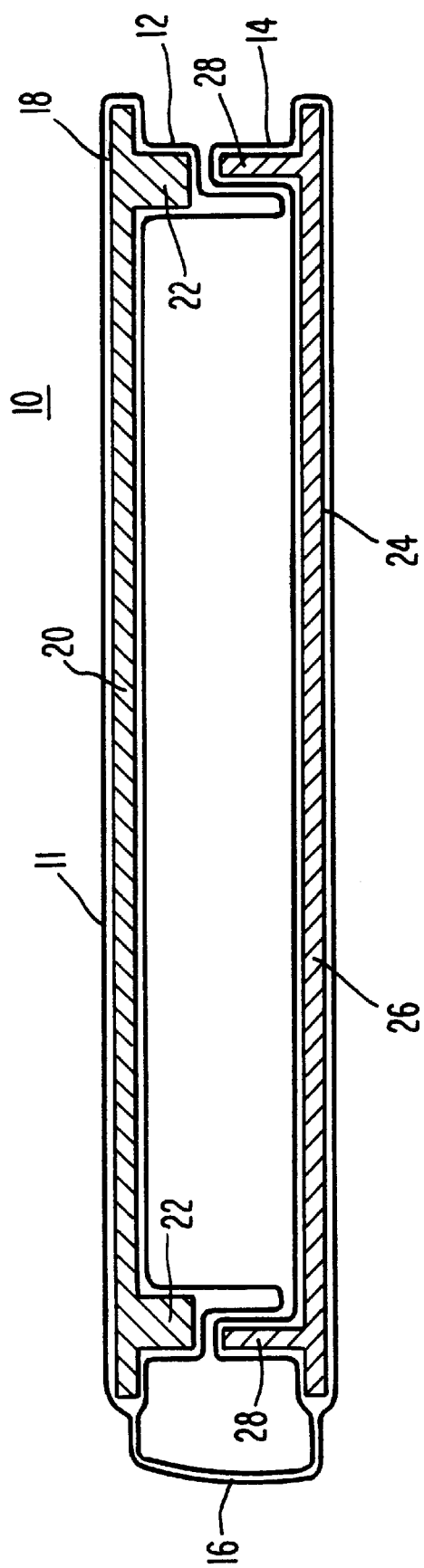
FIG. 4 is a cross-sectional view of the crush resistant case taken along line 4—4 of FIG. 1A.

FIG. 4 is a cross-sectional view of the crush resistant case of the present invention, taken along line 4—4 of FIG. 1A. As shown, the left and right rigid inserts 18, 24 are contained within the left and right halves 12, 14 of the cartridge shell 11. When the left and right halves 12, 14 of the case shell 11 are closed, the rib 22 on the left insert 18 comes together against the rib 28 on the right insert 24 to form a six-sided box that is very resistant to crushing. The construction of the case shell 11 ensures proper alignment of the inserts 18, 14, when the case is closed. In the preferred embodiment, the case shell 11 is formed of a less rigid plastic material, such as, for example, PETG.

As the foregoing illustrates, the present invention is directed to a crush resistant case for carrying removable disk cartridges. Unlike the flat cardboard inserts found in typical prior art cartridge cases, the left and right rigid inserts of the present invention each have a flat portion with a rectangular rib extending around the perimeter of the flat portion. When the case is closed, the rib on the left insert comes together against the rib on the right insert to form substantially a six-sided box that is very resistant to crushing. It is understood that changes may be made to the embodiment described above without departing from the broad inventive concepts thereof. Accordingly, the present invention is not limited to the particular embodiment disclosed, but is intended to cover all modifications that are within the spirit and scope of the invention as defined by the appended claims.

What is claimed is:

1. A crush resistant case for storing a cartridge, comprising a case shell having first and second portions, at least one of the first portion and the second portion of the case shell comprising a hollow flat portion and a hollow ridge extending around the perimeter of the hollow flat portion, the at least one portion of the case shell containing a rigid insert having a flat portion with a rib extending substantially around the perimeter of the flat portion, the flat portion of the rigid insert being disposed within the hollow flat portion of the at least one case shell portion and the rib of the rigid insert being disposed within the hollow ridge of the at least one case shell portion.

2. The crush resistant cartridge case recited in claim 1 wherein the perimeter of the flat portion of each rigid insert is substantially rectangular.

3. The crush resistant cartridge case recited in claim 1 wherein each rigid insert is formed of a rigid plastic material.

4. The crush resistant cartridge case recited in claim 3 wherein each rigid insert is formed of high impact styrene.

5. The crush resistant cartridge case recited in claim 1 wherein the rigid inserts within the left and right halves of the case shell come together when the case shell is closed to form substantially a six-sided box.

\* \* \* \* \*